Figure 3:
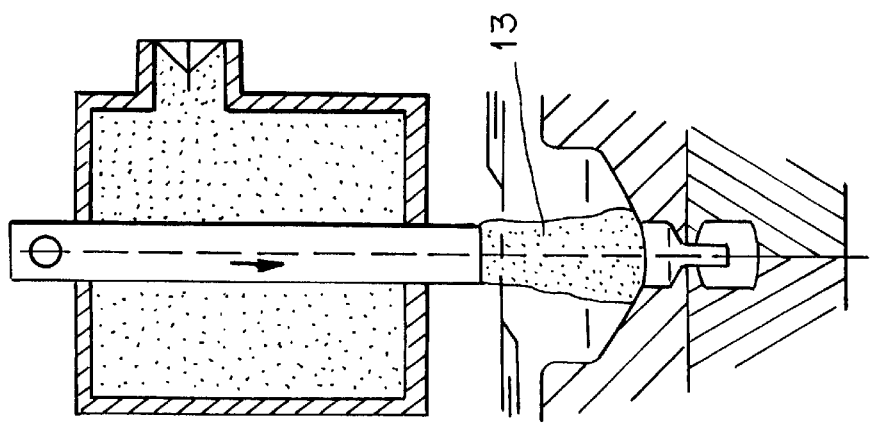

United States Patent

Hanot et al.

Patent Number: 6,045,736
Date of Patent: *Apr. 4, 2000

[54] METHOD FOR PRODUCING A MOLDED PLASTIC ARTICLE

[75] Inventors: Dominique Hanot, Lugrin, France; Gerhard Keller, Jongny; Ralph Roeder, Chernex, both of Switzerland

[73] Assignee: Aisa Automation Industrielle S.A., Vouvry, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/737,749
[22] PCT Filed: May 17, 1995
[86] PCT No.: PCT/EP95/01863
   § 371 Date: Nov. 15, 1996
   § 102(e) Date: Nov. 15, 1996
[87] PCT Pub. No.: WO95/31320
   PCT Pub. Date: Nov. 23, 1995

[30] Foreign Application Priority Data

May 18, 1994 [DE] Germany ............... 44 17 435

[51] Int. Cl.[7] ................................. B29C 39/02
[52] U.S. Cl. .................. 264/148; 264/319; 264/571; 425/256; 425/297; 425/449
[58] Field of Search .................. 264/148, 571, 264/319; 425/297, 308, 110, 121, 313, 256, 261, 449; 65/126, 127, 332, 303

[56] References Cited

U.S. PATENT DOCUMENTS 1,590,924  6/1926  Bridges .
1,780,550  11/1930 Barker .
1,798,217  3/1931  Noble .
2,448,915  9/1948  Schmid .
2,894,285  7/1959  Miller .
3,375,553  4/1968  Criss ............................ 425/256
4,296,061  10/1981 Buckingham ................. 425/447
4,784,819  11/1988 Spurr ......................... 264/328.19

FOREIGN PATENT DOCUMENTS 0 328 096  12/1990  European Pat. Off. .
30 23 415   1/1981  Germany .
58-71118    4/1983  Japan .
443647      2/1968  Switzerland .
155922      1/1921  United Kingdom .

*Primary Examiner*—Jan H. Silbaugh
*Assistant Examiner*—Edmund H. Lee
*Attorney, Agent, or Firm*—Collard & Roe, P.C.

[57] ABSTRACT

In a method for producing a molded plastic article, individual portions of material are removed from a flow of heat-plasticized material which flows vertically downwards from a closable dispensing aperture of a dispenser and are transferred to a mold before being pressed by closure of the mold to form a molded article. The required portions are cut by cutting shears from the flow of material at a point below the dispensing aperture and at a distance from it. A device for the production of the molded plastic article has a closable mold and a material dispenser for heat-plasticized synthetic material which can be arranged above the molding chamber. The dispenser has a dispensing aperture which points towards the mold and can be closed by a closure unit and from which the flow of plasticized material emerges. A shearing device for separating the required portions of material is situated below and at a distance from the dispensing aperture.

1 Claim, 2 Drawing Sheets

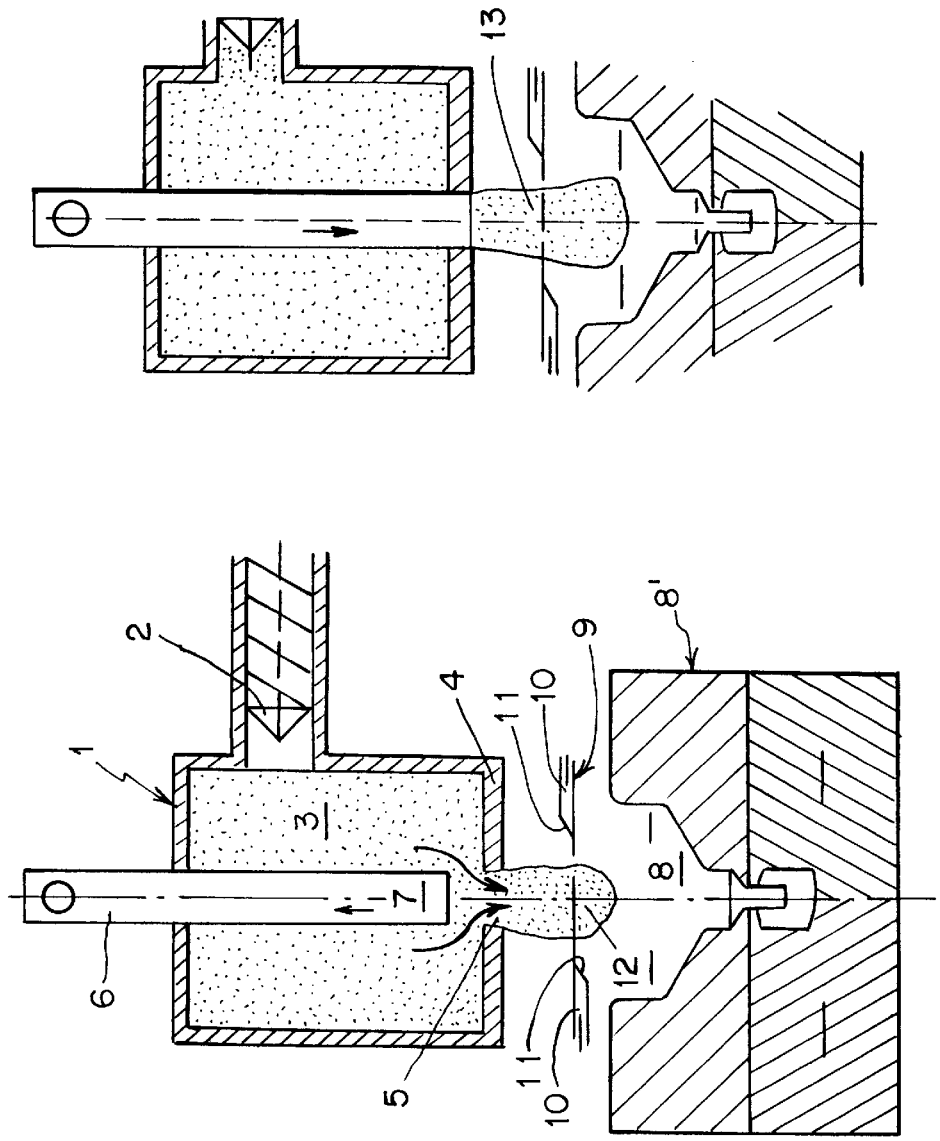

METHOD FOR PRODUCING A MOLDED PLASTIC ARTICLE

The invention relates to a process and devices for producing a molded article from plastic by separating individual portions of material from a vertically downwardly directed flow of material exiting from a sealable dispensing aperture of a material dispenser, said material being plastic plasticized by heat, transferring the separated portions of material into a hollow mold space, and pressing to a molded article by closing of the hollow mold space.

Such a process and such a device are known from DE-C3-30 23 415. According to said process and in said device, ring-shaped blanks are obtained by separating individual material portions and by closing a tubular part of the material dispenser, said part being directed against the hollow space of the mold, by a closing element displaceable against the end of the tubular part in the axial direction, whereby the separated, ring-shaped material portions are transferred by freely falling into the hollow space of the mold. In this connection, the ring-shaped material portions are molded to blanks by controlling the closing element, such blanks having an approximately lentiform cross-sectional profile. Preferably, the ring-shaped blanks are detached from the closing element by a stream of gas directed against the point of separation.

Said process requires a complicated nozzle system which, furthermore, requires a specific closing characteristic in order to obtain the desired cross sectional shape of the ring-shaped blank. Since thermoplastics exhibit strong adhesive or adhesion properties, additional measures are required, as a rule, such as currents of hot air for detaching the produced blank from the closing device.

Another process and another device are known from EP-B1- 328 096. In this connection, a blank is dispensed from a nozzle and separated, whereby the entire heated thermoplastic material required for a blank is deposited on an intermediate carrier, which can be driven under the nozzle, with the surface of said carrier forming a part of the pressing mold. Prior to or during the closing of the mold, the intermediate carrier is lowered and the blank is transferred into the pressing mold in this way. With said device, the pressing mold is more complicated on account of the extendable intermediate carrier, and consequently also more expensive.

According to the process according to DE-C3- 30 23 415, only ring-shaped blanks can be produced. According to EP-B1- 328 096, the blanks also can have a ring-shaped form. In connection with the manufacture of molded articles in the form of a tube that has to have a closed dispensing aperture, for example a pierceable diaphragm, or in the case of so-called "twist off" or "brake off" tubes, in connection with which the dispensing aperture is released only after a suitably designed closing part has been twisted off and/or broken off, the use of ring-shaped blanks poses problems because bubble-shaped air inclusions often occur during pressing, causing rejects.

A device for dispensing a portion of the material is known from U.S. Pat. No. 2,894,285, according to which thermoplastic material is dispensed from an extruder, the latter being arranged inclined, through a dispensing aperture into a duct-like chamber extending inclined, with application of pressure, whereupon the dispensing aperture is closed by a piston and the portion of the material thereby separated is transported through said chamber and finally into a hollow mold space, whereby stripping fingers close around the piston and, as the latter retracts, strip the portion of the material from the piston.

The problem of the invention is to propose a process and a device by which especially closed material portions of a desired size are obtainable in a simple and rapid way without additional measures, as well as to propose a device by which desired material portions and particularly closed portions of material are manufacturable in a simple way, such portions having a simple structure. Furthermore, the process and the device permit the manufacture of flawless tubes with an initially closed dispensing aperture.

The invention is explained in greater detail in the following on an exemplified embodiment with indication of variations, as well as by reference to the drawings, in which:

FIG. 1 shows a schematic view of a device according to the invention, in connection with which a flow of material exits through the opened dispensing aperture of a material dispenser; and FIGS. 2 to 5 show the same as in FIG. 1, however, in the form of different process stages in the formation of a desired material portion.

A material dispenser 1 is fed by means of an extruder screw 2 with the heat-plasticized plastic 3. The material dispenser 1 has a dispensing aperture 5 in its bottom 4. In the material dispenser 1, a closing body 6 is arranged, said body being movable up and down and designed in a way such that its lower end 7 in an upper position (FIG. 1) releases the dispensing aperture 5 for dispensing the plastic 3; that it closes the dispensing aperture 5 in a middle, lowered position (FIG. 2); and that in a lower position (FIGS. 3, 4), it is extended from the material dispenser 1 in the direction of a hollow mold space 8 of a pressing mold part 8', which may have any known form, also a multi-part form (the countermold is not shown), said hollow mold space 8 being arrangeable underneath the material dispenser 1.

Figure 4:
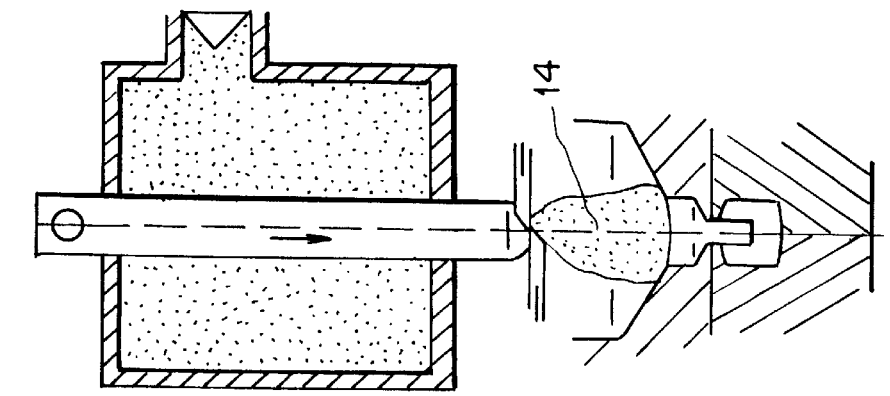
Figure 5:
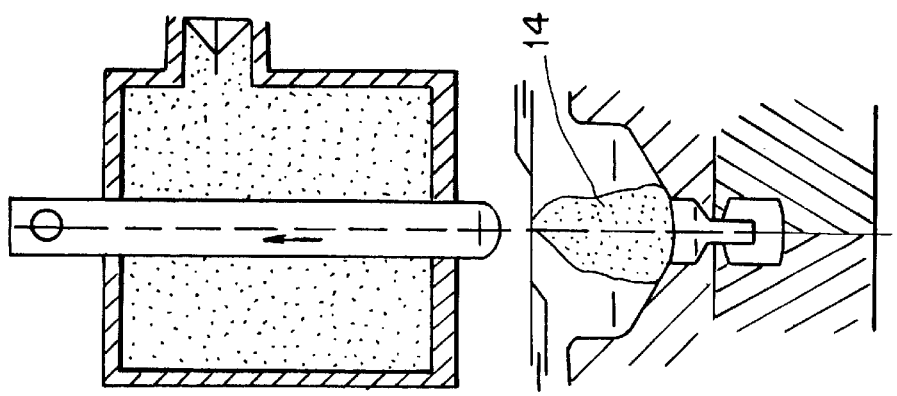

Between the pressing mold part 8' and the bottom 4 of the material dispenser 1, a shearing device 9 is arranged, whose blades 10 are movably arranged and capable of moving against and away from each other, in a way such that their cutting edges 11 slightly overlap each other at the end of a cutting operation (see FIG. 4). The blades 10 preferably have beveled cutting edges 11.

The process takes place as follows: The material dispenser 1 is filled by the extruder screw 2 with a heated thermoplastic 3. The end 7 of the closing body 6 is then moved upwardly in the direction of the wall of material dispenser 1 disposed opposite the bottom 4 (see FIG. 1), so that the dispensing aperture 5 is released. A material flow 12 of thermoplastic exits from the dispensing aperture 5, shown by arrows in FIG. 1. Then, the dispensing aperture 5 is closed by moving the closing body 6 down (see FIG. 2). In this position, a material flow part 13 is separated. In this connection, the material flow part 13 hangs on the lower end 7 of the closing body 6 due to the sticking or adhesive properties of the thermoplastic material, which make the separation of the blank more difficult with the known processes (see FIG. 2).

According to the exemplified embodiment, the closing body 6 with the material flow part 13 hanging on its lower end 7 is subsequently lowered further until the free lower end of the material flow part 13 supports itself on the wall of the hollow mold space 8 (see FIG. 3). Subsequently, the shearing device 9 is actuated and its blades 10 drive against each other and separate the desired material portion 14 from the material flow part 13 (see FIG. 4), whereby the material portion 14 has a closed compact, drop-like shape. Thereafter, the blades 10 of the shearing device 9 are driven back into their starting positions.

The shearing device 9 may be arranged with vertical adjustability (not shown) in order to vary the size of the separated material portions 14. Also, it is possible to make provision for a cleaning device (not shown) for cleaning the blades 10 from adhering plastic, if any, as the blades 10 are being retracted; such a device also may be extendable, if need be.

Preferably, the shearing device 9 and particularly its blades 10 are cooled (not shown) in order to largely prevent plastic from adhering to the blades 10. For said purpose, the blades 10 alternatively or additionally may be provided with an antisticking coating.

The size of the material flow 12 exiting through the dispensing aperture 5 from the material dispenser 1 can be controlled by controlling the spacing of end 7 of the closing body 6 from the dispensing aperture 5 and/or the duration over which the dispensing aperture 5 is kept open.

Also, it is possible to actuate the shearing device 9 already in the position shown in FIG. 2, in which the material flow part 13 is still freely hanging on the lower end 7 of the closing body 6. If this possibility is selected, the separated material portion 14 would freely drop into the hollow mold space 8. It would be possible in this way to frequency by which the material portions are produced because the closing body 6 would periodically have to travel a shorter stroke.

By lowering the closing body 6 into the dispensing aperture 5 (see FIG. 2), the material flow 12 is practically stopped, which makes a clean cut possible without any after-flow of material. Stopping of the material flow can be accomplished also, for example by briefly producing a vacuum in the interior of the material dispenser by means of the movement of a piston of a piston unit (not shown), so that no further material can exit through the open dispensing aperture 5 (see FIG. 1).

We claim:

1. Process for producing a molded article from plastic comprising:

providing a vertically downwardly directed material flow of heat-plasticized plastic exiting from a closable dispensing aperture of a material dispenser, stopping said material flow without any after-flow by extending a lower end of a closing body through said aperture thereby closing the aperture with said closing body and separating an individual material portion from the material flow, wherein said individual material portion hangs on the lower end of the extended closing body;

lowering the individual material portion hanging on the lower end of the extended closing body into a hollow mold space positioned below the aperture by further extending said closing body, and thereafter cutting a portion of the individual material portion from the lower end of the closing body by using cutting shears; and pressing the cut portion of the individual material portion in the hollow mold space into a molded article by closing the hollow mold space.

* * * * *